(12) United States Patent
Yamamoto et al.

(10) Patent No.: US 6,444,739 B1
(45) Date of Patent: Sep. 3, 2002

(54) POLYAMIDE RESIN COMPOSITION

(75) Inventors: Koji Yamamoto; Takeo Hayashi; Takahiro Takano, all of Kanagawa-ken (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 0 days.

(21) Appl. No.: 09/933,109

(22) Filed: Aug. 21, 2001

(30) Foreign Application Priority Data

Aug. 21, 2000 (JP) ........................................ 2000-249357

(51) Int. Cl.$^7$ ............................. C08L 77/00; C08K 3/10
(52) U.S. Cl. ...................... 524/404; 524/413; 524/424; 524/428; 524/430; 524/431; 524/433; 524/434; 524/435; 524/436; 524/437; 524/443; 524/451; 524/538; 525/432
(58) Field of Search ................................ 524/404, 413, 524/424, 428, 430, 431, 433, 434, 435, 436, 437, 443, 451, 538; 525/432

(56) References Cited

U.S. PATENT DOCUMENTS

| | | |
|---|---|---|
| 3,875,129 A | 4/1975 | Herwig et al. |
| 5,371,293 A | 12/1994 | Takagawa ................... 564/449 |
| 5,708,125 A * | 1/1998 | Liedloff et al. ............. 528/310 |
| 6,048,922 A | 4/2000 | Brink et al. ................. 524/494 |

FOREIGN PATENT DOCUMENTS

| | | |
|---|---|---|
| GB | 922677 | 4/1963 |
| JP | 38-648 | 1/1963 |
| JP | 4-22781 | 4/1992 |

\* cited by examiner

*Primary Examiner*—Ana Woodward
(74) *Attorney, Agent, or Firm*—Antonelli, Terry, Stout & Kraus, LLP

(57) ABSTRACT

The polyamide resin composition comprises a copolyamide resin, a nucleating agent for crystallization, and optionally an inorganic filler. The copolyamide resin is produced by polycondensing a carboxylic acid component mainly comprising adipic acid with a diamine component containing trans-1,4-bis(aminomethyl)cyclohexane, cis-1,4-bis (aminomethyl)cyclohexane, and optionally another diamine. The nucleating agent for crystallization is selected from an organic nucleating agent and an inorganic nucleating agent. The polyamide resin composition exhibits a good molding cycle and provides a shaped article excellent in the retention of rigidity at a high temperature condition, the durability under a high temperature condition, and the retention of mechanical properties after water-absorption. Therefore, the polyamide resin composition is useful as a metal replacement in various applications such as automobile parts, mechanical parts and electric or electronic parts.

24 Claims, No Drawings

POLYAMIDE RESIN COMPOSITION

BACKGROUND OF THE INVENTION

1. Field of the Invention

The present invention relates to a polyamide resin molding composition, specifically, to a polyamide resin composition having a good molding cycle because of its shortened crystallization time. More specifically, the present invention relates to a polyamide resin composition which provides, owing to its shortened crystallization time, a shaped article being excellent in the retention of rigidity at 100° C. or higher, the durability under a high temperature condition, and the retention of mechanical properties after water-absorption, thereby being capable of serving as a metal replacement.

2. Description of the Prior Art

Shaped articles of polyamide resins, typically, such as nylon 6 and nylon 66, have been extensively used as metal replacements in various applications such as automobile parts, mechanical parts and electric or electronic parts because of their excellent toughness, chemical resistance and electric characteristics. In some applications of the metal replacement, the polyamide shaped articles are further required to have a good retention of mechanical properties after water-absorption, and a good durability under a high temperature condition in addition to good mechanical properties such as strength and elastic modulus.

Conventional polyamide resins produced by polycondensing -1,4-bis(aminomethyl)cyclohexane with adipic acid (hereinafter occasionally referred to merely as "polyamide BAC6") are disclosed, for example, in Japanese Patent Publication Nos. 38-648 and 4-022781. These prior arts are however merely related to the process for the production of the polyamide BAC6 and its use as a packaging container.

Thus, hitherto, there are neither known nor industrially utilized any polyamide BAC6 resin composition having a good molding cycle which can produce shaped articles having an excellent retention of rigidity, a high durability under a high temperature condition and an excellent retention of mechanical properties after water-absorption.

SUMMARY OF THE INVENTION

An object of the present invention is to provide a polyamide resin composition having a good molding cycle which can produce shaped articles excellent in the retention of rigidity at 100° C. or higher, the durability under a high temperature condition and the retention of mechanical properties even after water-absorption.

As a result of extensive study in view of the above object, the inventors have found that a resin composition prepared by blending a nucleating agent for crystallization with a specific polyamide resin has a good molding cycle and shaped articles thereof have the above-described excellent properties. The present invention has been accomplished on the basis of this finding.

Thus, the present invention provides a polyamide resin composition comprising:

- 100 parts by mass of a copolyamide resin (A) which is produced by polycondensing a diamine component (a) comprising 70 to 100 mol % of a diamine component (I) and 30 to 0 mol % of a diamine component (II) with a dicarboxylic acid component (b), the diamine component (I) comprising 30 to 70 mol % of trans-1,4-bis(aminomethyl)cyclohexane and 70 to 30 mol % of cis-1,4-bis(aminomethyl)cyclohexane with the combined molar percentages of the cis-trans isomers being 100 mol %, the diamine component (II) comprising p-xylylenediamine and/or hexamethylenediamine, and the dicarboxylic acid component (b) comprising 70 mol % or more of adipic acid; and

- 1 to 30 parts by mass of at least one nucleating agent for crystallization (B) selected from the group consisting of an inorganic nucleating agent and an organic nucleating agent, the inorganic nucleating agent being a talc powder or a ceramic particle, and the organic nucleating agent being a crystalline resin having a half-crystallization time of 30 sec or less when measured at -160° C. by depolarized light intensity method.

The present invention further provides a polyamide resin composition comprising:

- 100 parts by mass of a copolyamide resin (A') which is produced by polycondensing a diamine component (a') comprising 70 to 100 mol % of a diamine component (I') and 30 to 0 mol % of a diamine component (II') with a dicarboxylic acid component (b), the diamine component (I') comprising 30 to 90 mol % of trans-1,4-bis(aminomethyl)cyclohexane and 70 to 10 mol % of cis-1,4-bis(aminomethyl)cyclohexane with the combined molar percentages of the cis-trans isomers being 100 mol %, the diamine component (II') comprising a diamine excluding both p-xylylenediamine and hexamethylenediamine, and the dicarboxylic acid component (b) comprising 70 mol % or more of adipic acid; and

- 1 to 30 parts by mass of at least one nucleating agent for crystallization (B) selected from the group consisting of an inorganic nucleating agent and an organic nucleating agent, the inorganic nucleating agent being a talc powder or a ceramic particle, and the organic nucleating agent being a crystalline resin having a half-crystallization time of 30 sec or less when measured at 160° C. by depolarized light intensity method.

DETAILED DESCRIPTION OF THE INVENTION

In the present invention, the diamine component (a) for the copolyamide resin (A) contains 70 to 100 mol % of a diamine component (I) comprising 30 to 70 mol % of trans-1,4-bis(aminomethyl)cyclohexane (hereinafter referred to as "trans-BAC") and 70 to 30 mol % of cis-1,4-bis(aminomethyl)cyclohexane (hereinafter referred to as "cis-BAC") with the combined molar percentages of the cis-trans isomers being 100 mol %.

1,4-Bis(aminomethyl)cyclohexane has a cis-isomer and a trans-isomer.

The molar ratio of the isomers (trans/cis) in the diamine component (I) for the copolyamide resin (A) is 70/30 to 30/70. When the diamine component (a) comprises only the diamine component (I) and the dicarboxylic acid component (b) is adipic acid, the molar ratio of the isomers (trans/cis) is preferably 70/30 to 45/55. A polyamide resin composition comprising a copolyamide resin (A) obtained by polycondensation of a dicarboxylic acid component (b) with a diamine component (I) having a molar ratio of the isomers in the above range, and a specific amount of a nucleating agent for crystallization (B) provides a shaped article excellent in the retention of rigidity at a high temperature condition, the durability under a high temperature condition and the retention of mechanical properties after water-absorption.

The diamine component (a) contains 30 to 0 mol % of the diamine component (II) comprising p-xylylenediamine and/ or hexamethylenediamine. As compared with a copolyamide resin (A) prepared using none of p-xylylenediamine and hexamethylenediamine, a copolyamide resin (A) prepared by polycondensation using the diamine component (II) shows a specifically shortened half-crystallization time when measured at 160° C. by depolarized light intensity method. Therefore, a polyamide resin composition prepared by blending the copolyamide resin (A) prepared using the copolymerizable diamine component (II) with at least one nucleating agent for crystallization (B) selected from the inorganic and organic nucleating agents is promoted in its crystallization in the molding process, thereby facilitating the reduction of the molding cycle.

In the present invention, the crystallization speed is expressed, as an indication, by the half-crystallization time measured at 160° C. by depolarized light intensity method. A shorter half-crystallization time means a higher crystallization speed. The measurement of the half-crystallization time by depolarized light intensity method was carried out according to the methods described in "Kobunshi Kagaku", Vol. 29, No. 323, pp. 139–143 (March, 1972) and "Kobunshi Kagaku", Vol. 29, No. 325, pp. 336–341 (March, 1972).

Specifically, the half-crystallization time was determined by measuring the time (sec) required until the depolarized light intensity I during the constant-temperature crystallization of a molten specimen reached the value represented by the following formula (2):

$$I_{1/2}=I_0+0.5\times(I_\infty-I_0) \quad (2)$$

wherein $I_0$ is an initial depolarized light intensity and $I_\infty$ is a depolarized light intensity at a final crystallization stage.

The molding cycle referred to in the present invention is a time required from injecting a molten polyamide resin composition in a cylinder of an injection molding machine into a mold, through a pressure keeping step and a cooling step, and until a shaped article is taken out of the mold. The cooling step can be shorted with increasing crystallization speed, thereby improving the molding cycle.

The diamine component (a) comprises 70 to 100 mol % of the diamine component (I) comprising 30 to 70 mol % of trans-BAC and 70 to 30 mol % of cis-BAC with the combined molar percentages of the cis-trans isomers being 100 mol %, and 30 to 0 mol % of the diamine component (II) comprising p-xylylenediamine and/or hexamethylenediamine. When the diamine component (II) is used, the diamine component (a) preferably comprises 70 to 95 mol % of the diamine component (I) and 30 to 5 mol % of the component (II) to sufficiently attain the effect of using the diamine component (II). A polyamide resin composition prepared by blending a copolyamide resin obtained by polycondensation using a diamine component excessively containing the diamine component (II) beyond the above range with a specific amount of the nucleating agent for crystallization (B) produces a shaped article poor in the retention of rigidity at a high temperature condition and the durability under a high temperature condition. By the use of the diamine component (a) having the above formulation, a polyamide resin composition prepared by blending the copolyamide resin (A) with a specific amount of the nucleating agent for crystallization (B) produces a shaped article excellent in the retention of rigidity at a high temperature condition and the durability under a high temperature condition.

In the present invention, the dicarboxylic acid component (b) for the copolyamide resin (A) contains 70 mol % or more of adipic acid. The dicarboxylic acid component (b) may further contain another dicarboxylic acid, for example, α,ω-linear aliphatic dicarboxylic acid such as succinic acid, glutaric acid, pimelic acid, suberic acid, azelaic acid, sebacic acid, undecadioic acid and dodecadioic acid; aromatic dicarboxylic acid such as terephthalic acid, isophthalic acid, 2,6-naphthalenedicarboxylic acid and 4,4'-biphenyldicarboxylic acid; and alicyclic dicarboxylic acid such as 1,4-cyclohexanedicarboxylic acid, 1,3-cyclohexanedicarboxylic acid, decalindicarboxylic acid and tetralindicarboxylic acid, in an amount of 30 mol % or less based on the total amount of the dicarboxylic acid component (b).

The copolyamide resin (A) used in the present invention is produced by polycondensing the diamine component (a) comprising 70 to 100 mol % of the diamine component (I) and 30 to 0 mol % of the diamine component (II) with a dicarboxylic acid component (b) containing 70 mol % or more of adipic acid. The diamine component (I) comprises 30 to 70 mol % of trans-BAC and 70 to 30 mol % of cis-BAC with the combined molar percentages of the cis-trans isomers being 100 mol %. The diamine component (II) comprises p-xylylenediamine and/or hexamethylenediamine. The conditions for the polycondensation are not critical in the present invention, and the polycondensation may be carried out in the manner known in the polyamide art. The polyamide resin composition prepared by blending the copolyamide resin (A) with a specific amount of the nucleating agent for crystallization (B) has a good molding cycle, a high mechanical strength and a high modulus of elasticity, and provides a shaped article excellent in the retention of rigidity at a high temperature condition, the durability under a high temperature condition and the retention of mechanical properties after water-absorption. Therefore, the polyamide resin composition of the present invention is useful as a resin composition for producing shaped articles. The copolyamide resin (A) is practically crystalline. To obtain the effect of the present invention, the copolyamide resin (A) is preferred to have a half-crystallization time of 15 sec or more when measured at 160° C. by depolarized light intensity method.

The crystalline polyamide referred to in the present invention is a crystalline polymer having a melting point such as polyamide 6 and polyamide 66. The crystallinity, the crystallinity distribution, the size of spherulite as aggregate of crystals and the spherulite distribution influence physical properties, specific gravity, dimensional stability, etc. of shaped articles of the polyamide resins. For example, the shaped article of the crystalline polyamide is produced by injection-molding a molten crystalline polyamide in a mold. By sufficiently proceeding the solidification and crystallization in the mold, the removal of the molded product from the mold becomes easy, and the strength and the retention of rigidity under a high temperature condition of the shaped article are enhanced.

The diamine component (a') for the copolyamide resin (A') contains 70 to 100 mol % of the diamine component (I') comprising 30 to 90 mol % of trans-BAC and 70 to 10 mol % of cis-BAC with the combined molar percentages of the cis-trans isomers being 100 mol %.

1,4-Bis(aminomethyl)cyclohexane has a cis-isomer and a trans-isomer. The molar ratio of the isomers (trans/cis) in the diamine component (I') for the copolyamide resin (A') is 90/10 to 30/70. When the diamine component (a') comprises only the diamine component (I') and the dicarboxylic acid component (b) is adipic acid, the molar ratio of the isomers (trans/cis) is preferably 70/30 to 45/55. A polyamide resin composition comprising a copolyamide resin (A') obtained by polycondensation of a dicarboxylic acid component (b) with a diamine component (I') having a molar ratio of the isomers in the above range, and a specific amount of a nucleating agent for crystallization (B) provides a shaped article excellent in the retention of rigidity at a high temperature condition, the durability under a high temperature condition and the retention of mechanical properties after water-absorption.

The diamine component (a') for the copolyamide resin (A') contains 30 to 0 mol % of the diamine component (II') comprising a diamine other than both p-xylylenediamine and hexamethylenediamine. The diamine for the diamine component (II') may include an aliphatic diamine such as tetramethylenediamine, pentamethylenediamine, hexamethylenediamine, octamethylenediamine and nonamethylenediamine; and an aromatic diamine such as p-phenylenediamine, m-xylylenediamine and p-xylylenediamine. By using the diamine component (a') which contains 30 to 0 mol % of the diamine component (II'), the polyamide resin composition comprising the copolyamide resin (A') produced by the diamine component (a') and other components, and a specific amount of the nucleating agent for crystallization (B) also provides a shaped article excellent in the retention of rigidity at a high temperature condition, the durability under a high temperature condition and the retention of mechanical properties after water-absorption.

The diamine component (a') for the copolyamide resin (A') comprises 70 to 100 mol % of the diamine component (I') comprising 30 to 90 mol % of trans-BAC and 70 to 10 mol % of cis-BAC with the combined molar percentages of the cis-trans isomers being 100 mol %, and 30 to 0 mol % of the diamine component (II'). When the diamine component (II') is used, the diamine component (a') preferably comprises 70 to 95 mol % of the diamine component (I') and 30 to 5 mol % of the component (II') to sufficiently attain the effect of using the diamine component (II').

The dicarboxylic acid component (b) for the copolyamide resin (A') is the same as that for the copolyamide resin (A).

The copolyamide resin (A') used in the present invention is produced by polycondensing the diamine component (a') comprising 70 to 100 mol % of the diamine component (I') and 30 to 0 mol % of the diamine component (II') with a dicarboxylic acid component (b) containing 70 mol % or more of adipic acid. The diamine component (I') comprises 30 to 90 mol % of trans-BAC and 70 to 10 mol % of cis-BAC with the combined molar percentages of the cis-trans isomers being 100 mol %. The diamine component (II') comprises a diamine excluding both p-xylylenediamine and hexamethylenediamine. The conditions for the polycondensation are not critical in the present invention, and the polycondensation may be carried out in the manner known in the polyamide art. The polyamide resin composition prepared by blending the copolyamide resin (A') with a specific amount of the nucleating agent for crystallization (B) has a good molding cycle, a high mechanical strength and a high modulus of elasticity, and provides a shaped article excellent in the retention of rigidity at a high temperature condition, the durability under a high temperature condition and the retention of mechanical properties after water-absorption. Therefore, the polyamide resin composition of the present invention is useful as a resin composition for producing shaped articles. The copolyamide resin (A') is practically crystalline. To obtain the effect of the present invention, the copolyamide resin (A') is preferred to have a half-crystallization time of 15 sec or more when measured at 160° C. by depolarized light intensity method.

The polyamide resin composition of the present invention is prepared by blending 100 parts by mass of the copolyamide resin (A) or the copolyamide resin (A') with 1 to 30 parts, preferably 2 to 20 parts by mass of at least one nucleating agent for crystallization (B) selected from the group consisting of an inorganic nucleating agent and an organic nucleating agent. The inorganic nucleating agent may be a talc powder or a ceramic particle. The organic nucleating agent is a crystalline resin having a half-crystallization time of 30 sec or less when measured at 160° C. by depolarized light intensity method. The organic nucleating agent is effective for the purpose even when the half-crystallization time thereof is larger than that of the copolyamide resin (A) or the copolyamide resin (A').

By blending the nucleating agent for crystallization (B), the crystallization speed of the copolyamide resin (A) or the copolyamide resin (A') is increased to reduce the crystallization time, thereby shortening the molding cycle. With such a shortened molding cycle attained by blending the nucleating agent for crystallization (B), the crystallization of the copolyamide resin (A) or the copolyamide resin (A') proceeds sufficiently to produce a shaped article excellent in the mechanical properties, the retention of rigidity at a high temperature condition, and the retention of mechanical properties after water-absorption. The half-crystallization time of the polyamide resin composition comprising the copolyamide resin (A) or the copolyamide resin (A') blended with the nucleating agent for crystallization (B) is preferably as small as possible, and more preferably 10 sec or less.

If the nucleating agent for crystallization (B) is excessively blended beyond the above range, the flowability of the resin composition at the molding process is poor and the resultant shaped article is reduced in its mechanical properties and retention of rigidity at a high temperature condition. If the blending amount of the nucleating agent for crystallization (B) is less than 1 part by mass, the molding cycle cannot be shortened, thereby reducing the mechanical properties and the retention of rigidity at a high temperature condition of the resultant shaped article because of insufficient crystallization. By regulating the blending amount of the nucleating agent for crystallization (B) within 1 to 30 parts by mass based on 100 parts by mass of the copolyamide resin (A) or the copolyamide resin (A'), the crystallization is promoted in the molding process to easily shorten the molding cycle and undesirable results such as reduction in the mechanical properties and the retention of rigidity at a high temperature condition of the resultant shaped article can be avoided.

In the case of blending 1 to 30 parts by mass of the nucleating agent for crystallization (B) to 100 parts by mass of the copolymer resin (A) in which the diamine component (a) is substantially only the diamine component (I) and the dicarboxylic acid composition (b) is substantially adipic acid, or in the case of blending 1 to 30 parts by mass of the nucleating agent for crystallization (B) to 100 parts by mass of the copolymer resin (A') in which the diamine component (a') is substantially only the diamine component (I') and the dicarboxylic acid composition (b) is substantially adipic acid, the blending amounts of the inorganic nucleating agent and the organic nucleating agent are preferred to satisfy the following formula (1):

$$4200 \times \exp(-0.14 \times X) < 0.2 \times Y + Z \tag{1}$$

wherein X is trans-BAC×100/(trans-BAC+cis-BAC), Y is the blending amount (by mass) of the organic nucleating agent per 100 parts by mass of the copolyamide resin (A) or the copolyamide resin (A'), and Z is the blending amount (by mass) of the inorganic nucleating agent per 100 parts by mass of the copolyamide resin (A) or the copolyamide resin (A').

When the blending amounts of the inorganic nucleating agent and the organic nucleating agent satisfy the formula (1), the half-crystallization time of the resultant resin composition becomes 10 sec or less at 160° C. Therefore, the crystallization in the molding process is promoted and the molding cycle can be easily shortened.

The inorganic nucleating agent used in the present invention may be a talc powder or a ceramic particle. The ceramic material may include a fine ceramic and a new ceramic, and specifically, oxide, nitride, carbide and boride of a metal such as silicon, aluminum, titanium, zirconium, magnesium and iron. The talc powder and boron nitride are particularly preferable. The talc powder and ceramic particle preferably have a particle size of 100 μm or smaller, more preferably 80 μm or smaller.

The crystalline resin used as the organic nucleating agent in the present invention has a half-crystallization time of 30 sec or less, preferably 10 sec or less when measured at 160° C. by a depolarized light intensity method. By the use of the crystalline resin having a half-crystallization time of 30 sec or less as the organic nucleating agent, the half-crystallization time of the copolyamide resin (A) or the copolyamide resin (A') can be reduced to promote the crystallization during the molding process and easily shorten the molding cycle. Examples of the crystalline resin are polyamide MXD6 produced by polycondensing m-xylylenediamine with adipic acid, polyamide MP6 produced by polycondensing m-xylylenediamine and p-xylylenediamine with adipic acid, polyamide MP6T produced by polycondensing m-xylylenediamine and p-xylylenediamine with adipic acid and terephthalic acid, polyamide 6, polyamide 66, polyamide 46, polyamide 66T produced by polycondensing hexamethylenediamine with adipic acid and terephthalic acid, polyamide 6IT produced by polycondensing hexamethylenediamine with isophthalic acid and terephthalic acid, polyamide 6/66 (copolymer constituted by polyamide 6 component and polyamide 66 component), polyamide 610, polyamide 612, polyamide 11, polyamide 12, mixtures of the above polyamides, polyethylene terephthalate, polybutylene terephthalate, polyethylene naphthalate, and polybutylene naphthalate, with polyamide MXD6, polyamide MP6, polyamide 6, polyamide 66, polyamide 46, polyamide 66T, polyamide 6IT, polyethylene terephthalate and polybutylene terephthalate being preferred, and polyamide 66 being more preferred.

If desired, 10 to 150 parts by mass of an inorganic filler, excluding inorganic compound used as the inorganic nucleating agent, may be added to 100 parts by mass of the polyamide resin composition comprising the copolyamide resin (A) or the copolyamide resin (A') and a specific amount of the nucleating agent for crystallization (B). The inorganic filler is not specifically limited as far as generally used in the resin composition art, and preferably a powdery filler, a fibrous filler, a granular filler, a flake-like filler or any combination thereof with the fibrous filler being more preferred.

The powdery filler has a particle size of preferably 100 μm or smaller, more preferably 80 μor smaller. Examples of the powdery filler include kaolinite; carbonate such as calcium carbonate and magnesium carbonate; sulfate such as calcium sulfate and magnesium sulfate; sulfides; and metal oxides. Examples of the fibrous filler include glass fiber, potassium titanate whisker, calcium sulfate whisker, carbon fiber and alumina fiber with the glass fiber being preferred.

The resin composition of the present invention may further contain, if required, one or more additives such as flame retardant, anti-static agent, lubricant, plasticizer, stabilizer against oxidation, heat or ultraviolet light and colorant.

The present invention will be described in more detail by reference to the following production examples and examples.

In the following examples, the properties of polyamide shaped articles were evaluated by the following methods.
(1) Half-crystallization Time The half-crystallization times of the copolyamide resin (A) and the copolyamide resin (A') were measured at 160° C. by a depolarized light intensity method before and after blending the nucleating agent for crystallization (B).

Apparatus: Crystallization rate measuring apparatus MK701 available from Kotaki Seisakusho.

Temperature for melting sample: 30° C. higher than the melting point.

Time for melting sample: 3 minutes.

Temperature of crystallizing bath: 160° C.
(2) Releasability

The releasability of the polyamide resin composition was evaluated on the basis of easy production of injection-molded article.

Good: Easily released from the mold.

Poor: Deformation of molded article or insertion of the ejector pin into molded article occurred during the release operation because of insufficient crystallization.
(3) Retention of flexural properties at 100° C.

The flexural strength and flexural modulus of an injection-molded test piece (12.7 mm×6.4 mm×127 mm) were measured in 100° C. atmosphere by a thermostatic bending tester (Tensilon RTC-131A available from Orientec Co., Ltd.) according to ASTM D790. The results were compared with the values obtained at 20° C.
(4) Heat-aging Resistance An injection-molded test piece (12.7 mm×3.2 mm×215 mm) was kept in a Geer oven at 180° C. for 1,000 hr, and then the tensile strength thereof was measured by a tensile tester according to ASTM D638. The result was compared with the tensile strength measured before the heat treatment.
(5) Retention of Mechanical Properties after Water-absorption An injection-molded test piece (12.7 mm×3.2 mm×215 mm) was immersed in 100° C. boiling water for 1,000 hr, and then the tensile strength thereof was measured by a tensile tester. The result was compared with the tensile strength measured before the immersion.

PRODUCTION EXAMPLE 1

A 50-L reaction vessel equipped with a stirrer, a partial condenser, a thermometer, a dropping funnel and a nitrogen gas feed tube was charged with 9.687 kg of 1,4-BAC (trans/cis=65/35), 10.000 kg of adipic acid and 8.400 kg of distilled water, and then sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 320° C. over 230 min, and simultaneously the inner pressure was dropped to 0.1 MPa. After the inner temperature reached 320° C., the inner pressure was continuously reduced to 80 kPa over 10 min. Thereafter, the reaction temperature was continuously raised to 330° C. to continue the reaction for 10 min. The resultant polyamide BAC6 had a relative viscosity of 2.5 (measured at 25° C. in a concentration of Ig in 100 mL 96% sulfuric acid), a melting point of 303° C., and a half-crystallization time of 16 sec at 160° C.

PRODUCTION EXAMPLE 2

Into the same reaction vessel as used in Production Example 1, were charged 9.687 kg of 1,4-BAC (trans/cis= 55/45), 10.000 kg of adipic acid and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 300° C. over 200 min, and simultaneously the inner pressure was dropped to 0.1 MPa. After the inner temperature reached 300° C., the inner pressure was continuously reduced to 80 kPa over 10 min. Thereafter, the reaction temperature was continuously raised to 310° C. to continue the reaction for 10 min. The resultant polyamide BAC6 had a relative viscosity of 2.4 (measured at 25° C. in a concentration of lg in 100 mL 96% sulfuric acid), a melting point of 288° C., and a half-crystallization time of 137 sec at 160° C.

PRODUCTION EXAMPLE 3

Into the same reaction vessel as used in Production Example 1, were charged 9.687 kg of 1,4-BAC (trans/cis= 43/57), 10.000 kg of adipic acid and 8.400 kg of distilled water, and then the reaction vessel was sufficiently purged with nitrogen. After sealing the reaction vessel, the inner temperature and inner pressure were increased to 215° C. and 1.9 MPa. The water vapor in the reaction vessel was discharged for 70 min while maintaining the inner pressure at 1.9 MPa. Then, the inner temperature was raised to 270° C. over 180 min, and simultaneously the inner pressure was dropped to 0.1 MPa. After the inner temperature reached 270° C., the inner pressure was continuously reduced to 80 kPa over 10 min. Thereafter, the reaction temperature was continuously raised to 280° C. to continue the reaction for 10 min. The resultant polyamide BAC6 had a relative viscosity of 2.9 (measured at 25° C. in a concentration of lg in 100 mL 96% sulfuric acid), a melting point of 249° C., and a half-crystallization time of 1582 sec at 160° C.

PRODUCTION EXAMPLE 4

Into the same reaction vessel as used in Production Example 1, were charged 9.687 kg of 1,4-BAC (trans/cis= 20/80), 10.000 kg of adipic acid and 8.400 kg of distilled water, and then the reaction vessel was sufficiently purged with nitrogen. After sealing the reaction vessel, the inner temperature and inner pressure were increased to 215° C. and 1.9 MPa. The water vapor in the reaction vessel was discharged for 70 min while maintaining the inner pressure at 1.9 MPa. Then, the inner temperature was raised to 260° C. over 150 min, and simultaneously the inner pressure was dropped to 0.1 MPa. After the inner temperature reached 260° C., the inner pressure was continuously reduced to 80 kPa over 10 min. Thereafter, the reaction temperature was continuously raised to 270° C. to continue the reaction for 10 min. The resultant polyamide BAC6 had a relative viscosity of 2.6 (measured at 25° C. in a concentration of lg in 100 mL 96% sulfuric acid), a melting point of 249° C., and a half-crystallization time of 10430 sec at 160° C.

PRODUCTION EXAMPLE 5

Into the same reaction vessel as used in Production Example 1, were charged 9.687 kg of 1,4-BAC (trans/cis= 10/90), 10.000 kg of adipic acid and 8.400 kg of distilled water, and then the reaction vessel was sufficiently purged with nitrogen. After sealing the reaction vessel, the inner temperature and inner pressure were increased to 215° C. and 1.9 MPa. The water vapor in the reaction vessel was discharged for 70 min while maintaining the inner pressure at 1.9 MPa. Then, the inner temperature was raised to 250° C. over 150 min, and simultaneously the inner pressure was dropped to 0.1 MPa. After the inner temperature reached 250° C. the inner pressure was continuously reduced to 80 kPa over 10 min. Thereafter, the reaction temperature was continuously raised to 260° C. to continue the reaction for 10 min. The resultant polyamide BAC6 had a relative viscosity of 2.5 (measured at 25° C. in a concentration of lg in 100 mL 96% sulfuric acid), a melting point of 237° C., and a half-crystallization time of 25300 sec at 160° C.

PRODUCTION EXAMPLE 6

Into the same reaction vessel as used in Production Example 1, were charged 9.687 kg of 1,4-BAC (trans/cis =65/35), 9.000 kg of adipic acid, 1.137 kg of terephthalic acid and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 320° C. over 230 min, and simultaneously the inner pressure was dropped to 0.1 MPa. After the inner temperature reached 320° C., the inner pressure was continuously reduced to 80 kPa over 10 min. Thereafter, the reaction temperature was continuously raised to 330° C. to continue the reaction for 10 min. The resultant copolyamide (hereinafter may be referred to as "PA-BAC6T") had a relative viscosity of 5.2 (measured at 25° C. in a concentration of lg in 100 mL 96% sulfuric acid), a melting point of 308° C., and a half-crystallization time of 230 sec at 160° C.

PRODUCTION EXAMPLE 7

Into the same reaction vessel as used in Production Example 1, were charged 9.687 kg of 1,4-BAC (trans/cis= 65/35), 9.000 kg of adipic acid, 1.137 kg of isophthalic acid and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 310° C. over 230 min, and simultaneously the inner pressure was dropped to 0.1 MPa. After the inner temperature reached 310° C., the inner pressure was continuously reduced to 80 kPa over 10 min. Thereafter, the reaction temperature was continuously raised to 320° C. to continue the reaction for 10 min. The resultant copolyamide (hereinafter may be referred to as "PA-BAC6I") had a relative viscosity of 2.9 (measured at 25° C. in a concentration of lg in 100 mL 96% sulfuric acid), a melting point of 294° C., and a half-crystallization time of 438 sec at 160° C.

PRODUCTION EXAMPLE 8

Into the same reaction vessel as used in Production Example 1, were charged 7.781 kg of 1,4-BAC (trans/cis =50/50), 10.000 kg of adipic acid, 1.888 kg of p-xylylenediamine and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 300° C. over 200 min, and simultaneously the inner pressure was dropped to 0.1 MPa. After the inner temperature reached 300° C., the inner pressure was continuously reduced to 80 kPa over 10 min. Thereafter, the reaction temperature was continuously raised to 310° C. to continue the reaction for 10 min. The resultant copolyamide (hereinafter may be referred to as "PA-BP6") had a relative viscosity of 2.5 (measured at 25° C. in a concentration of lg in 100 mL 96% sulfuric acid), a melting point of 287° C., and a half-crystallization time of 25 sec at 160° C.

PRODUCTION EXAMPLE 9

Into the same reaction vessel as used in Production Example 1, were charged 9.687 kg of 1,4-BAC (trans/cis= 82/18), 9.000 kg of adipic acid, 1.137 kg of isophthalic acid and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 320° C. over 240 min, and simultaneously the inner pressure was dropped to 0.1 MPa. After the inner temperature reached 320° C., the inner pressure was continuously reduced to 80 kPa over 10 min. Thereafter, the reaction temperature was continuously raised to 330° C. to continue the reaction for 10 min. The resultant copolyamide (hereinafter may be referred to as "PA-BAC6I") had a relative viscosity of 2.5 (measured at 25° C. in a concentration of lg in 100 mL 96% sulfuric acid), a melting point of 309° C., and a half-crystallization time of 105 sec at 160° C.

PRODUCTION EXAMPLE 10

Into the same reaction vessel as used in Production Example 1, were charged 5.840 kg of 1,4-BAC (trans/cis= 55/45), 3.175 kg of hexamethylenediamine, 10.000 kg of adipic acid and 8.400 kg of distilled water, and then the reaction vessel was sufficiently purged with nitrogen. After sealing the reaction vessel, the inner temperature and inner pressure were increased to 227° C. and 2.4 MPa. The water vapor in the reaction vessel was discharged for 70 min while maintaining the inner pressure at 2.4 MPa. Then, the inner temperature was raised to 290° C. over 200 min, and simultaneously the inner pressure was dropped to 0.1 MPa. After the inner temperature reached 290° C., the inner pressure was continuously reduced to 80 kPa over 10 min. Thereafter, the reaction temperature was continuously raised to 300° C. to continue the reaction for 10 min. The resultant copolyamide (hereinafter may be referred to as "PA-BAC66") had a relative viscosity of 2.4 (measured at 25° C. in a concentration of lg in 100 mL 96% sulfuric acid), a melting point of 272° C., and a half-crystallization time of 36 sec at 160° C.

EXAMPLE 1

The polyamide BAC6 (95 parts by mass) obtained in Production Example 2 was blended with one part by mass of polyamide 66 (Zytel 101 available from DuPont), 4 parts by mass of talc (Micron White 5000A available from Hayashi Kasei Co., Ltd.), and 96 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 5.3 sec at 160° C.

The resultant resin composition was injection-molded by an injection-molding machine to prepare test pieces for tensile test, bending test and water-absorption test. The results of the evaluation are shown in Table 1.

EXAMPLE 2

The polyamide BAC6 (100 parts by mass) obtained in Production Example 2 was blended with one part by mass of polyamide 66 (Zytel 101 available from DuPont), two parts by mass of talc (Micron White 5000A available from Hayashi Kasei Co., Ltd.), and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 8.2 sec at 160° C.

The resultant resin composition was molded into test pieces in the same manner as in Example 1. The results of the evaluation are shown in Table 1.

EXAMPLE 3

The polyamide BAC6 (93 parts by mass) obtained in Production Example 2 was blended with 7 parts by mass of talc (Micron White 5000A available from Hayashi Kasei Co., Ltd.) and 93 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 6.5 sec at 160° C.

The resultant resin composition was molded into test pieces in the same manner as in Example 1. The results of the evaluation are shown in Table 1.

EXAMPLE 4

The polyamide BAC6 (93 parts by mass) obtained in Production Example 2 was blended with two parts by mass of boron nitride and 93 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 8.1 sec at 160° C.

The resultant resin composition was molded into test pieces in the same manner as in Example 1. The results of the evaluation are shown in Table 1.

EXAMPLE 5

The polyamide BACG (96 parts by mass) obtained in Production Example 1 was blended with 4 parts by mass of talc (Micron White 5000A available from Hayashi Kasei Co., Ltd.) and 96 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 325° C., water-cooled and pelletized. The half-crystallization time of the pellet was 5.1 sec at 160° C.

The resultant resin composition was molded into test pieces in the same manner as in Example 1. The results of the evaluation are shown in Table 1.

TABLE 1

|  | Examples | | | | |
| --- | --- | --- | --- | --- | --- |
|  | 1 | 2 | 3 | 4 | 5 |
| (1) Half-crystallization time (sec) | | | | | |
| before blending nucleating agent | 137 | 137 | 137 | 137 | 16 |
| after blending nucleating agent | 5.3 | 8.2 | 6.5 | 8.1 | 5.1 |
| Molding conditions | | | | | |
| Cylinder temperature (° C.) | 320 | 320 | 320 | 320 | 325 |
| Mold temperature (° C.) | 160 | 160 | 160 | 160 | 160 |
| Cooling time (sec) | 15 | 30 | 15 | 15 | 15 |
| (2) Releasability | good | good | good | good | good |
| (3) Retention of flexural properties | | | | | |
| Strength retention (%) | 70.5 | 70.7 | 71.2 | 70.3 | 71.0 |
| Modulus retention (%) | 83.4 | 83.4 | 83.2 | 83.5 | 83.4 |
| (4) Heat-aging resistance | | | | | |
| Tensile strength retention (%) | 79.0 | 79.9 | 79.3 | 78.8 | 81.0 |
| (5) Retention of mechanical properties after water absorption | | | | | |
| Tensile strength retention (%) | 47.4 | 48.0 | 46.5 | 47.9 | 55.0 |

EXAMPLE 6

The polyamide BAC6 (84 parts by mass) obtained in Production Example 3 was blended with 9 parts by mass of polyamide 66 (Zytel 101 available from DuPont), 7 parts by mass of talc (Micron White 5000A available from Hayashi Kasei Co., Ltd.), and 93 parts by mass of glass fibers (03T-296GH available from Nippon Electric Glass Co., Ltd.). The resultant mixture was melt-kneaded kneaded in a vented single-screw extruder (Nakatani Machinery Co., Ltd.) at a cylinder temperature of 285° C., water-cooled and pelletized. The half-crystallization time of the pellet was 9.5 sec at 160° C.

The resultant resin composition was molded into test pieces in the same manner as in Example 1. The results of the evaluation are shown in Table 2.

EXAMPLE 7

The polyamide BAC6T (88 parts by mass) obtained in Production Example 6 was blended with 5 parts by mass of polyamide 66 (Zytel 101 available from DuPont), 7 parts by mass of talc (Micron White 5000A available from Hayashi Kasei Co., Ltd.), and 93 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 335° C. water-cooled and pelletized. The half-crystallization time of the pellet was 8.2 sec at 160° C.

The resultant resin composition was molded into test pieces in the same manner as in Example 1. The results of the evaluation are shown in Table 2.

EXAMPLE 8

The polyamide BAC6I (100 parts by mass) obtained in Production Example 7 was blended with 8 parts by mass of talc (Micron White 5000A available from Hayashi Kasei Co., Ltd.) and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 9.0 sec at 160° C.

The resultant resin composition was molded into test pieces in the same manner as in Example 1. The results of the evaluation are shown in Table 2.

EXAMPLE 9

The polyamide BP6 (100 parts by mass) obtained in Production Example 8 was blended with 4 parts by mass of talc (Micron White 5000A available from Hayashi Kasei Co., Ltd.) and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 310° C., water-cooled and pelletized. The half-crystallization time of the pellet was 6.1 sec at 160° C.

The resultant resin composition was molded into test pieces in the same manner as in Example 1. The results of the evaluation are shown in Table 2.

TABLE 2

|  | Examples | | | |
| --- | --- | --- | --- | --- |
|  | 6 | 7 | 8 | 9 |
| (1) Half-crystallization time (sec) | | | | |
| before blending nucleating agent | 1582 | 230 | 438 | 25 |
| after blending nucleating agent | 9.5 | 8.2 | 9.0 | 6.1 |
| Molding conditions | | | | |
| Cylinder temperature (° C.) | 285 | 335 | 320 | 310 |
| Mold temperature (° C.) | 160 | 160 | 160 | 160 |
| Cooling time (sec) | 60 | 30 | 60 | 15 |
| (2) Releasability | good | good | good | good |
| (3) Retention of flexural properties | | | | |
| Strength retention (%) | 64.9 | 70.6 | 71.0 | 67.0 |
| Modulus retention (%) | 79.1 | 82.8 | 83.0 | 83.0 |
| (4) Heat-aging resistance | | | | |
| Tensile strength retention (%) | 79.0 | 79.3 | 80.1 | 74.0 |
| (5) Retention of mechanical properties after water absorption | | | | |
| Tensile strength retention (%) | 44.5 | 48.9 | 50.9 | 47.0 |

EXAMPLE 10

The polyamide BAC6I (100 parts by mass) obtained in Production Example 9 was blended with 8 parts by mass of talc (Micron White 5000A available from Hayashi Kasei Co., Ltd.) and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 330° C. water-cooled and pelletized. The half-crystallization time of the pellet was 7.0 sec at 160° C.

The resultant resin composition was molded into test pieces in the same manner as in Example 1. The results of the evaluation are shown in Table 3.

EXAMPLE 11

The polyamide BAC6 (93 parts by mass) obtained in Production Example 2 was blended with 7 parts by mass of talc (Micron White 5000A available from Hayashi Kasei Co., Ltd.) and 10 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C. water-cooled and pelletized. The half-crystallization time of the pellet was 6.5 sec at 160° C.

The resultant resin composition was molded into test pieces in the same manner as in Example 1. The results of the evaluation are shown in Table 3.

EXAMPLE 12

The polyamide BAC6 (93 parts by mass) obtained in Production Example 2 was blended with 7 parts by mass of talc (Micron White 5000A available from Hayashi Kasei Co., Ltd.) and 139 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 320° C., water-cooled and pelletized. The half-crystallization time of the pellet was 6.5 sec at 160° C.

The resultant resin composition was molded into test pieces in the same manner as in Example 1. The results of the evaluation are shown in Table 3.

TABLE 3

|  |  | Examples | | |
| --- | --- | --- | --- | --- |
|  |  | 10 | 11 | 12 |
| (1) | Half-crystallization time (sec) | | | |
|  | before blending nucleating agent | 105 | 137 | 137 |
|  | after blending nucleating agent | 7.0 | 6.5 | 6.5 |
|  | Molding conditions | | | |
|  | Cylinder temperature (° C.) | 330 | 320 | 320 |
|  | Mold temperature (° C.) | 160 | 160 | 160 |
|  | Cooling time (sec) | 30 | 15 | 15 |
| (2) | Releasability | good | good | good |
| (3) | Retention of flexural properties | | | |
|  | Strength retention (%) | 71.4 | 70.3 | 73.8 |
|  | Modulus retention (%) | 83.4 | 83.2 | 92.5 |
| (4) | Heat-aging resistance | | | |
|  | Tensile strength retention (%) | 80.3 | 79.0 | 80.1 |
| (5) | Retention of mechanical properties after water absorption | | | |
|  | Tensile strength retention (%) | 51.3 | 46.7 | 49.2 |

COMPARATIVE EXAMPLE 1

The polyamide BAC6 (100 parts by mass) obtained in Production Example 3 was blended with 20 parts by mass of polyamide 66 (Zytel 101 available from DuPont), 20 parts by mass of talc (Micron White 5000A available from Hayashi Kasei Co., Ltd.), and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 285° C., water-cooled and pelletized. The half-crystallization time of the pellet was 4.8 sec at 160° C.

The resultant resin composition was molded into test pieces in the same manner as in Example 1. The results of the evaluation are shown in Table 4.

COMPARATIVE EXAMPLE 2

The polyamide BAC6 (100 parts by mass) obtained in Production Example 3 was blended with 100 parts by mass of glass fibers (03T-296GH available from Nippon Electric Glass Co., Ltd.). The resultant mixture containing no nucleating agent for crystallization was melt-kneaded in a vented single-screw extruder (Nakatani Machinery Co., Ltd.) at a cylinder temperature of 285° C., water-cooled and pelletized. The half-crystallization time of the pellet was 1582 sec at 160° C.

The resultant resin composition was molded into test pieces in the same manner as in Example 1. The results of the evaluation are shown in Table 4.

COMPARATIVE EXAMPLE 3

The polyamide BAC6 (96 parts by mass) obtained in Production Example 4 was blended with 4 parts by mass of polyamide 66 (Zytel 101 available from DuPont), 10 parts by mass of talc (Micron White 5000A available from Hayashi Kasei Co., Ltd.), and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 270° C., water-cooled and pelletized. The half-crystallization time of the pellet was 573 sec at 160° C.

The resultant resin composition was injection-molded in the same manner as in Example 1. The results of the evaluation are shown in Table 4.

COMPARATIVE EXAMPLE 4

The polyamide BAC6 (83 parts by mass) obtained in Production Example 5 was blended with 10 parts by mass of polyamide 66 (Zytel 101 available from DuPont), 16 parts by mass of talc (Micron White 5000A available from Hayashi Kasei Co., Ltd.), and 93 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 260° C., water-cooled and pelletized. The half-crystallization time of the pellet was 1705 sec at 160° C.

The resultant resin composition was molded into test pieces in the same manner as in Example 1. The results of the evaluation are shown in Table 4.

COMPARATIVE EXAMPLE 5

The polyamide BAC66 (100 parts by mass) obtained in Production Example 10 was blended with 2 parts by mass of polyamide 66 (Zytel 101 available from DuPont), 4 parts by mass of talc (Micron White 5000A available from Hayashi Kasei Co., Ltd.), and 100 parts by mass of glass fibers (03T-296GH available from Nippon Electric Glass Co., Ltd.). The resultant mixture was melt-kneaded in a vented single-screw extruder (Nakatani Machinery Co., Ltd.) at a cylinder temperature of 300° C. water-cooled and pelletized. The half-crystallization time of the pellet was 5.6 sec at 160° C.

The resultant resin composition was molded into test pieces in the same manner as in Example 1. The results of the evaluation are shown in Table 4.

TABLE 4

|  |  | Comparative Examples | | | | |
| --- | --- | --- | --- | --- | --- | --- |
|  |  | 1 | 2 | 3 | 4 | 5 |
| (1) | Half-crystallization time (sec) | | | | | |
|  | before blending nucleating agent | 1582 | 1582 | 10430 | 25300 | 36 |
|  | after blending nucleating agent | 4.8 | 1582 | 537 | 1705 | 5.6 |
|  | Molding conditions | | | | | |
|  | Cylinder temperature (° C.) | 285 | 285 | 270 | 260 | 300 |
|  | Mold temperature (° C.) | 160 | 160 | 160 | 160 | 160 |
|  | Cooling time (sec) | 15 | 120 | 140 | 150 | 15 |
| (2) | Releasability | good | poor | poor | poor | good |
| (3) | Retention of flexural properties | | | | | |
|  | Strength retention (%) | 63.4 | 67.4 | 66.1 | 65.0 | 61.3 |
|  | Modulus retention (%) | 54.2 | 58.9 | 58.8 | 56.1 | 42.0 |
| (4) | Heat-aging resistance | | | | | |
|  | Tensile strength retention (%) | 73.5 | 75.6 | 76.4 | 75.9 | 70.2 |
| (5) | Retention of mechanical properties after water absorption | | | | | |
|  | Tensile strength retention (%) | 39.3 | 36.7 | 34.6 | 32.0 | 37.3 |

The polyamide resin composition of the present invention, which is a blend of a nucleating agent for crystallization and a polyamide resin produced by polycondensing a diamine component mainly comprising a mixed 1,4-bis(aminomethyl)cyclohexane and a dicarboxylic acid component mainly comprising adipic acid, exhibits a good molding cycle and provides a shaped article excellent in the retention of rigidity at a high temperature condition, the durability under a high temperature condition, and the retention of mechanical properties after water-absorption. Therefore, the polyamide resin composition is useful as a metal replacement in various applications such as automobile parts, mechanical parts and electric or electronic parts.

What is claimed is:

1. A polyamide resin composition comprising:
   100 parts by mass of a copolyamide resin (A) which is produced by polycondensing a diamine component (a) comprising 70 to 100 mol % of a diamine component (I) and 30 to 0 mol % of a diamine component (II) with a dicarboxylic acid component (b), the diamine component (I) comprising 30 to 70 mol % of trans-1,4-bis(aminomethyl)cyclohexane and 70 to 30 mol % of cis-1,4-bis(aminomethyl)cyclohexane with the combined molar percentages of the cis-trans isomers being 100 mol %, the diamine component (II) comprising p-xylylenediamine and/or hexamethylenediamine, and the dicarboxylic acid component (b) comprising 70 mol % or more of adipic acid; and
   1 to 30 parts by mass of at least one nucleating agent for crystallization (B) selected from the group consisting of an inorganic nucleating agent and an organic nucleating agent, the inorganic nucleating agent being a talc powder or a ceramic particle, and the organic nucleating agent being a crystalline resin having a half-crystallization time of 30 sec or less when measured at 160° C. by depolarized light intensity method.

2. The polyamide resin composition according to claim 1, wherein the half-crystallization time of the polyamide resin composition is 10 sec or less when measured at 160° C. by depolarized light intensity method.

3. The polyamide resin composition according to claim 1, wherein the diamine component (a) is substantially a diamine mixture comprising 30 to 70 mol % of trans-1,4-bis(aminomethyl)cyclohexane and 70 to 30 mol % of cis-1,4-bis(aminomethyl)cyclohexane with the combined molar percentages of the cis-trans isomers being 100 mol %, and the dicarboxylic acid component (b) is substantially adipic acid.

4. The polyamide resin composition according to claim 1, wherein the diamine component (a) is substantially a diamine mixture comprising 45 to 70 mol % of trans-1,4-bis(aminomethyl)cyclohexane and 55 to 30 mol % of cis-1,4-bis(aminomethyl)cyclohexane with the combined molar percentages of the cis-trans isomers being 100 mol %, and the dicarboxylic acid component (b) is substantially adipic acid.

5. The polyamide resin composition according to claim 3, wherein the blending amounts of the inorganic nucleating agent and the organic nucleating agent to the copolyamide resin (A) satisfy the following formula (1):

$$4200 \times \exp(-0.14 \times X) < 0.2 \times Y + Z \quad (1)$$

wherein X is trans-1,4-bis(aminomethyl)cyclohexane×100/(trans-1,4-bis(aminomethyl)cyclohexane+cis-1,4-bis(aminomethyl)cyclohexane), Y is the blending amount by mass of the organic nucleating agent per 100 parts by mass of the copolyamide resin (A), and Z is the blending amount by mass of the inorganic nucleating agent per 100 parts by mass of the copolyamide resin (A).

6. The polyamide resin composition according to claim 1, wherein the half-crystallization time of the organic nucleating agent is 10 sec or less when measured at 160° C. by depolarized light intensity method.

7. The polyamide resin composition according to claim 1, wherein the organic nucleating agent is a polyamide resin.

8. The polyamide resin composition according to claim 7, wherein the organic nucleating agent is polyamide 66.

9. The polyamide resin composition according to claim 1, wherein the inorganic nucleating agent is talc.

10. The polyamide resin composition according to claim 1, wherein 10 to 150 parts by mass of an inorganic filler excluding a compound used as the inorganic nucleating agent is blended to 100 parts by mass of the polyamide resin composition.

11. The polyamide resin composition according to claim 10, wherein the inorganic filler is a fibrous filler.

12. The polyamide resin composition according to claim 11, wherein the fibrous filler is a glass fiber.

13. A polyamide resin composition comprising:
100 parts by mass of a copolyamide resin (A') which is produced by polycondensing a diamine component (a') comprising 70 to 100 mol % of a diamine component (I') and 30 to 0 mol % of a diamine component (II') with a dicarboxylic acid component (b), the diamine component (I') comprising 30 to 90 mol % of trans-1,4-bis(aminomethyl)cyclohexane and 70 to 10 mol % of cis-1,4-bis(aminomethyl)cyclohexane with the combined molar percentages of the cis-trans isomers being 100 mol %, the diamine component (II') comprising a diamine excluding both p-xylylenediamine and hexamethylenediamine, and the dicarboxylic acid component (b) comprising 70 mol % or more of adipic acid; and 1 to 30 parts by mass of at least one nucleating agent for crystallization (B) selected from the group consisting of an inorganic nucleating agent and an organic nucleating agent, the inorganic nucleating agent being a talc powder or a ceramic particle, and the organic nucleating agent being a crystalline resin having a half-crystallization time of 30 sec or less when measured at 160° C. by depolarized light intensity method.

14. The polyamide resin composition according to claim 13, wherein the half-crystallization time of the polyamide resin composition is 10 sec or less when measured at 160° C. by depolarized light intensity method.

15. The polyamide resin composition according to claim 13, wherein the diamine component (a') is substantially a diamine mixture comprising 30 to 70 mol % of trans-1,4-bis(aminomethyl)cyclohexane and 70 to 30 mol % of cis-1,4-bis(aminomethyl)cyclohexane with the combined molar percentages of the cis-trans isomers being 100 mol %, and the dicarboxylic acid component (b) is substantially adipic acid.

16. The polyamide resin composition according to claim 15, wherein the blending amounts of the inorganic nucleating agent and the organic nucleating agent to the copolyamide resin (A') satisfy the following formula (1):

$$4200 \times \exp(-0.14 \times X) < 0.2 \times Y + Z \quad (1)$$

wherein X is trans-1,4-bis(aminomethyl)cyclohexane×100/(trans-1,4-bis(aminomethyl)cyclohexane+cis-1,4-bis(aminomethyl)cyclohexane), Y is the blending amount by mass of the organic nucleating agent per 100 parts by mass of the copolyamide resin (A'), and Z is the blending amount by mass of the inorganic nucleating agent per 100 parts by mass of the copolyamide resin (A').

17. The polyamide resin composition according to claim 13, wherein the diamine component (a') is substantially a diamine mixture comprising 45 to 70 mol % of trans-1,4-bis(aminomethyl)cyclohexane and 55 to 30 mol % of cis-1,4-bis(aminomethyl)cyclohexane with the combined molar percentages of the cis-trans isomers being 100 mol %, and the dicarboxylic acid component (b) is substantially adipic acid.

18. The polyamide resin composition according to claim 13, wherein the half-crystallization time of the organic nucleating agent is 10 sec or less when measured at 160° C. by depolarized light intensity method.

19. The polyamide resin composition according to claim 13, wherein the organic nucleating agent is a polyamide resin.

20. The polyamide resin composition according to claim 19, wherein the organic nucleating agent is polyamide 66.

21. The polyamide resin composition according to claim 13, wherein the inorganic nucleating agent is talc.

22. The polyamide resin composition according to claim 13, wherein 10 to 150 parts by mass of an inorganic filler excluding a compound used as the inorganic nucleating agent is blended to 100 parts by mass of the polyamide resin composition.

23. The polyamide resin composition according to claim 22, wherein the inorganic filler is a fibrous filler.

24. The polyamide resin composition according to claim 23, wherein the fibrous filler is a glass fiber.

\* \* \* \* \*